United States Patent
Brannon et al.

(10) Patent No.: US 6,505,853 B2
(45) Date of Patent: Jan. 14, 2003

(54) INFLATABLE CURTAIN WITH POSITIONING DEVICE

(75) Inventors: Kenneth D. Brannon, Mesa, AZ (US); Wael S. Elqadah, Gilbert, AZ (US); Timothy A. Swann, Mesa, AZ (US); John P. O'Loughlin, Gilbert, AZ (US); James K. O'Docherty, Mesa, AZ (US); Nathan R. Butters, Tempe, AZ (US)

(73) Assignees: TRW Inc., Lyndhurst, OH (US); Simula, Inc., Phoenix, AZ (US)

( * ) Notice: Subject to any disclaimer, the term of this patent is extended or adjusted under 35 U.S.C. 154(b) by 0 days.

(21) Appl. No.: 09/800,564

(22) Filed: Mar. 7, 2001

(65) Prior Publication Data

US 2002/0125692 A1 Sep. 12, 2002

(51) Int. Cl.[7] ............................................. B60R 21/22
(52) U.S. Cl. ................. 280/730.2; 280/729; 280/743.1; 280/743.2; 280/749
(58) Field of Search ........................ 280/730.2, 730.1, 280/749, 743.1, 743.2, 729, 753, 751

(56) References Cited

U.S. PATENT DOCUMENTS

| | | |
|---|---|---|
| 3,687,485 A | 8/1972 | Campbell |
| 5,265,903 A | 11/1993 | Kuretake et al. |
| 5,333,898 A | 8/1994 | Stutz |
| 5,462,308 A | 10/1995 | Seki et al. |
| 5,588,672 A | 12/1996 | Karlow et al. |
| 5,660,414 A | 8/1997 | Karlow et al. |
| 5,707,075 A | 1/1998 | Kraft et al. |
| 5,788,270 A | 8/1998 | Haland et al. |
| 5,865,462 A | 2/1999 | Robins et al. |
| 6,073,961 A | * 6/2000 | Bailey et al. ............ 280/730.2 |
| 6,135,493 A | * 10/2000 | Jost et al. ................ 280/743.1 |
| 6,152,481 A | * 11/2000 | Webber et al. .......... 280/730.2 |
| 6,176,515 B1 | * 1/2001 | Wallner et al. ............. 280/729 |

FOREIGN PATENT DOCUMENTS

WO 9743146 11/1997

* cited by examiner

Primary Examiner—Eric Culbreth
(74) Attorney, Agent, or Firm—Tarolli, Sundheim, Covell, Tummino & Szabo L.L.P.

(57) ABSTRACT

An apparatus (10) for helping to protect an occupant of a vehicle (12) that has a side structure (16) and a roof (28) comprises an inflatable vehicle occupant protection device (14) that is inflatable away from the roof into a position between the side structure of the vehicle and a vehicle occupant. The device (14) has a perimeter (50) defined by an upper edge (52) positioned adjacent the roof (28), an opposite lower edge (54), and front and rear edges (56 and 58) spaced apart along the upper and lower edges. The device (14) includes overlying panels secured together along the perimeter (50) to define an inflatable volume (34) and is free from association with an inflatable tube. An inflator (24) provides inflation fluid for inflating the device (14). A flexible elongated member (90) extends through the device (14) and is coiled around a portion (70) of the inflatable volume (34) of the device. The member (90) has a first end (92) and an opposite second end (94) fixed to the vehicle side structure (16). The member (90) resists movement of the device (14) away from the vehicle side structure (16) when the device is inflated.

20 Claims, 2 Drawing Sheets

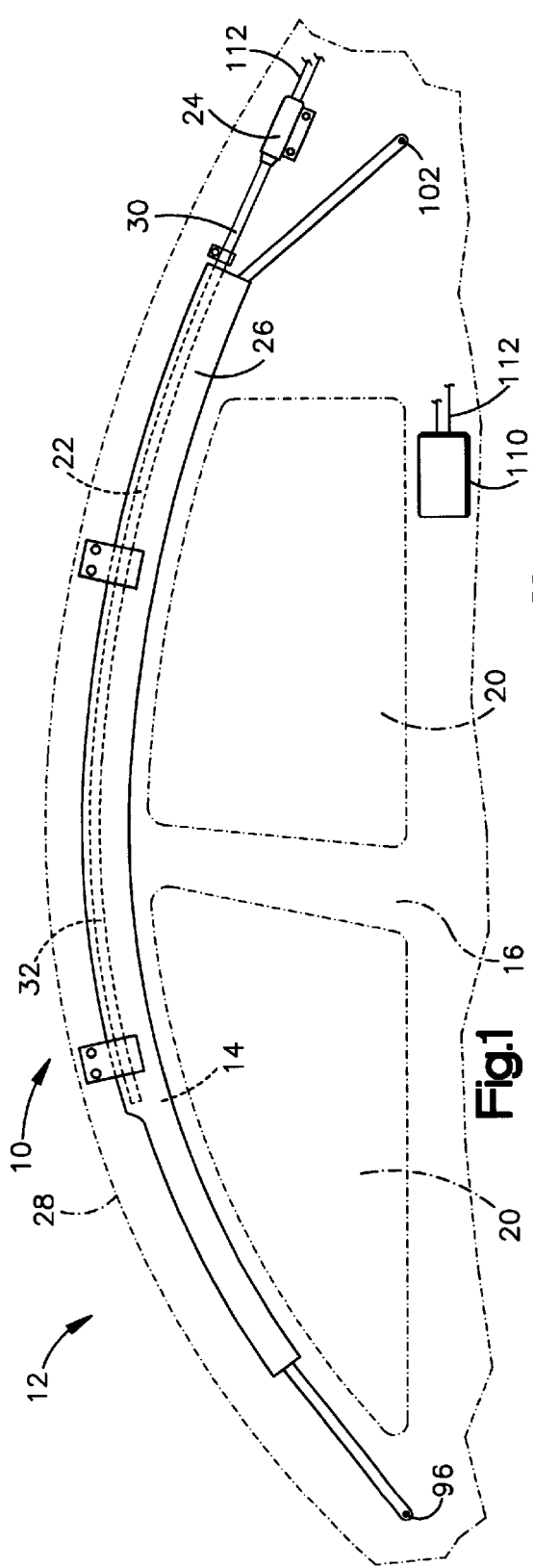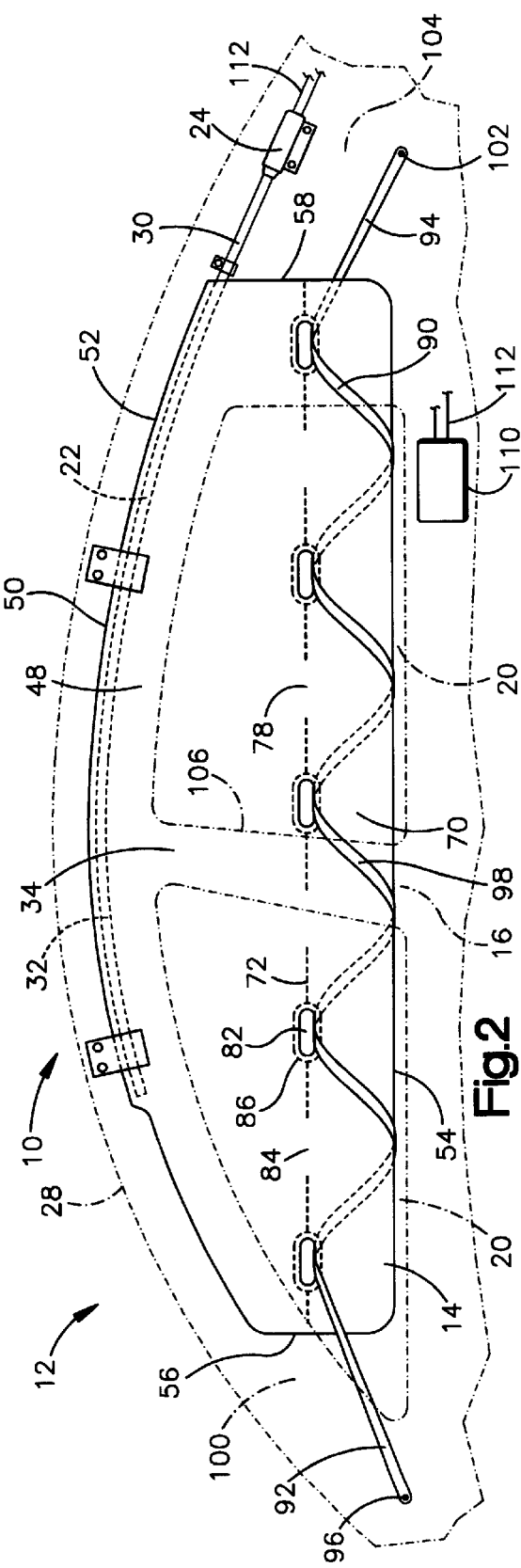

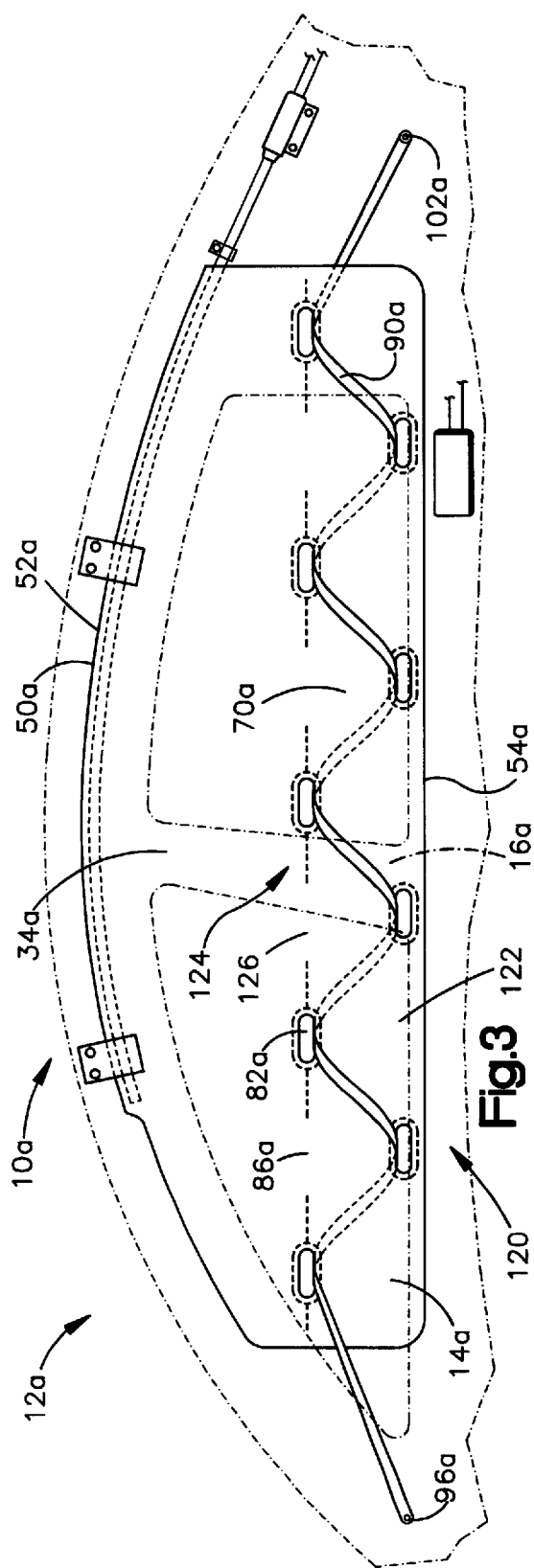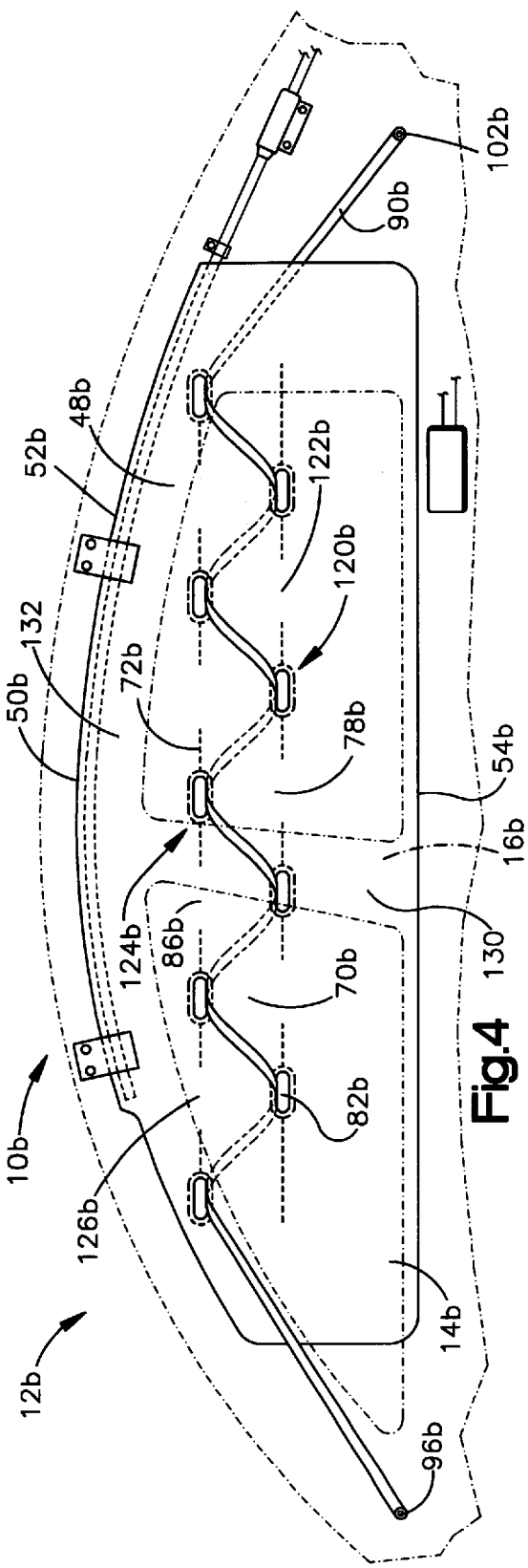

INFLATABLE CURTAIN WITH POSITIONING DEVICE

FIELD OF THE INVENTION

The present invention relates to an inflatable vehicle occupant protection device for helping to protect a vehicle occupant in the event of a side impact to a vehicle and/or a vehicle rollover.

BACKGROUND OF THE INVENTION

It is known to inflate an inflatable vehicle occupant proteciton device to help protect a vehicle occupant in the event of a vehicle collision. An inflatable curtain that is inflatable from the roof of the vehicle downward inside the passenger compartment between a vehicle occupant and the side structure of the vehicle in the event of a side impact or rollover is also known. Such an inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle that has a side structure and a roof. The apparatus includes a inflatable vehicle occupant protection device that is inflatable away from the roof into a position between the side structure of the vehicle and a vehicle occupant. The inflatable vehicle occupant protection device has a perimeter defined by an upper edge positioned adjacent the roof, an opposite lower edge, and front and rear edges spaced apart along the upper and lower edges. The inflatable vehicle occupant protection device includes overlying panels secured together along the perimeter to define an inflatable volume within the perimeter. The inflatable vehicle occupant protection device is free from association with an inflatable tube.

An inflator provides inflation fluid for inflating the inflatable vehicle occupant protection device. A flexible elongated member extends through the inflatable vehicle occupant protection device and is coiled around a portion of the inflatable volume of the inflatable vehicle occupant protection device. The flexible elongated member has a first end fixed to the vehicle side structure at a first location and an opposite second end fixed to the vehicle side structure at a second location. The flexible elongated member resists movement of the inflatable vehicle occupant protection device away from the vehicle side structure when the inflatable vehicle occupant protection device is inflated.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic view of a vehicle safety apparatus in a deflated condition in accordance with a first embodiment of the present invention;

FIG. 2 is a schematic view of the vehicle safety apparatus of FIG. 1 in an inflated condition;

FIG. 3 is a schematic view of a vehicle safety apparatus in an inflated condition in accordance with a second embodiment of the present invention; and FIG. 4 is a schematic view of a vehicle safety apparatus in an inflated condition in accordance with a third embodiment of the present invention.

DESCRIPTION OF PREFERRED EMBODIMENTS

As representative of the present invention, FIGS. 1 and 2 illustrate an apparatus 10 for helping to protect an occupant of a vehicle. As shown in FIGS. 1 and 2, the apparatus 10 includes an inflatable vehicle occupant protection device in the form of an inflatable curtain 14 mounted adjacent to the side structure 16 of the vehicle 12. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32 that is disposed in an inflatable volume 34 (FIG. 2) of the inflatable curtain 14. The second end portion 32 of the fill tube 22 has a plurality of openings (not shown) that provide fluid communication between the fill tube 22 and the inflatable volume 34 of the inflatable curtain 14.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator which uses the combustion of gas-generating material to generate inflation fluid.

The apparatus 10 includes a housing 26 (FIG. 1) that stores the inflatable curtain 14 in a deflated condition. The fill tube 22, the deflated inflatable curtain 14, and housing 26 have an elongated configuration and extend along the vehicle roof 28 and along the side structure 16 of the vehicle 12 above the side windows 20.

In the embodiment illustrated in FIG. 2, the inflatable curtain 14 is formed from a sheet of material that is folded-over to form an outer panel (not shown) and an overlying inner panel 48. The outer panel and inner panel 48 are secured to each other along a perimeter 50 of the inflatable curtain 14 by known means (not shown) such as stitching, adhesively bonding or weaving the panels together. The perimeter 50 is defined by an upper edge 52 positioned adjacent the roof 28, an opposite lower edge 54, and front and rear edges 56 and 58, respectively, that are spaced apart along the upper and lower edges. The perimeter 50 defines the inflatable volume 34. When the inflatable curtain 14 is in the inflated condition, the outer panel is positioned adjacent to the side structure 16 of the vehicle 12. It should be understood, however, that alternative constructions of the inflatable curtain 14 could be used without negatively affecting its functionality.

The inflatable volume 34 of the inflatable curtain 14 includes a portion 70 that is defined by stitching 72 that secures the outer panel to the inner panel 48. The portion 70 extends along the lower edge 54 of the inflatable curtain 14. The stitching 72 is omitted at positions along the length of the portion 70 to form passages 78 that provide fluid communication between the portion 70 of the inflatable volume 34 and the remainder of the inflatable volume.

The inflatable curtain 14 includes a row of apertures 82 spaced along the length of the inflatable curtain 14 along an edge 84 of the portion 70. The edge 84 of the portion 70 is spaced away from the upper and lower edges 52 and 54 of the inflatable curtain 14. Each aperture 82 extends through the inflatable curtain 14 and is encircled by stitching 86 that interconnects the outer panel and inner panel 48. The stitching 86 blocks leakage of inflation fluid from the inflatable curtain 14 through the apertures 82.

The apparatus 10 also includes a flexible elongated member 90. The flexible elongated member 90 comprises a strap constructed of a fabric material, or the like, and has a first end 92 and an opposite second end 94. The first end 92 of the flexible elongated member 90 is fixedly connected to the side structure 16 of the vehicle 12 at a first location 96. The first location 96 is positioned on or near an A pillar 100 of the vehicle 12, forward of the front edge 56 of the inflatable curtain 14. The second end 94 of the flexible elongated member 90 is secured to the side structure 16 of the vehicle at a second location 102. The second location 102 is positioned on or near a C pillar 104 of the vehicle 12, rearward of the rear edge 58 of the inflatable curtain 14.

Those skilled in the art will appreciate that it may be desirable to position the inflatable curtain 14 between the A pillar 100 and a B pillar 106 of the vehicle 12. In this instance, the second end 94 of the flexible elongated member 90 may be secured to the side structure 16 on or near the B pillar 106.

The flexible elongated member 90 extends from the first location 96 and is coiled around the portion 70 of the inflatable curtain 14 in a helical configuration. The flexible elongated member 90 extends through the apertures 82 and wraps around the lower edge 54 of the inflatable curtain 14 as it coils around the portion 70 to the second location 102. In the deflated condition of FIG. 1, the flexible elongated member 90 is stored in the housing 26 and extends from the first location 96 in a path along the vehicle roof 28 and side structure 16 of the vehicle 12 above the side windows 20 to the second location 102.

The vehicle 12 includes a sensor mechanism 110 (shown schematically in FIGS. 1 and 2) for sensing a side impact to the vehicle 12 and/or a rollover of the vehicle 12. The sensor mechanism 110 actuates the inflator 24 in response to the sensing of a side impact or a vehicle rollover.

In the event of a rollover of the vehicle or a side impact to the vehicle 12 of a magnitude greater than a predetermined threshold value, the sensor mechanism 110 provides an electrical signal over lead wires 112 to the inflator 24. The electrical signal causes the inflator 24 to be actuated in a known manner. The inflator 24 discharges fluid under pressure into the fill tube 22. The fill tube 22 directs the fluid into the inflatable volume 34 (FIG. 2) of the inflatable curtain 14. The passages 78 direct the fluid into the portion 70 of the inflatable volume 34.

The inflatable curtain 14 inflates under the pressure of the inflation fluid from the inflator 24. The housing 26 (FIG. 1) opens and the inflatable curtain 14 (FIG. 2) inflates in a downward direction as shown in the drawings and in a downward direction with respect to the direction of forward travel of the vehicle 12. The curtain 14, when inflated, extends fore and aft in the vehicle 12 along the side structure 16. The inflated curtain 14 is positioned between the side structure 16 of the vehicle 12 and any occupant of the vehicle 12.

In the inflated condition, the portion 70 is generally tubular in configuration. As the inflatable curtain 14 inflates, the portion 70 expands radially outward, and thus laterally in the vehicle 12, thereby increasing the tubular diameter of the portion 70. The flexible elongated member 90, coiled around the portion 70, has a helix portion 98 with a helical diameter and a helical length. The helical diameter of the helix portion 98 increases along with the diameter of the portion 70 as the portion is inflated. As the helical diameter increases, the length of the flexible elongated member in the helix portion 98, i.e. the helical length, also increases. As a result, when the inflatable curtain 14 is inflated, the flexible elongated member 90 is tensioned between the first and second locations 96 and 102.

In the inflated condition, the tensioned flexible elongated member 90 resists movement of the inflatable curtain 14 away from the side structure 16 of the vehicle 12. Thus, the flexible elongated member 90 helps maintain the position of the inflated curtain 14 between any occupant of the vehicle 12 and the side structure 16 of the vehicle 12.

Those skilled in the art will recognize that it may be desirable to apply a tension to the inflatable curtain 14 in the downward direction in which the curtain 14 is inflated. In this instance, the first and second locations 96 and 102 may also be positioned below the lower edge 54 of the inflated inflatable curtain 14. As a result, when the inflatable curtain 14 is inflated, the flexible elongated member 90 tensions the curtain 14 in a downward direction as shown in the drawings and in a downward direction with respect to the direction of forward travel of the vehicle 12.

It is known in the art to associate an inflatable tube with an inflatable curtain in a vehicle. Such an inflatable tube may help to apply a tension to the inflatable curtain or may help to position the curtain relative to the vehicle. A known inflatable curtain includes an inflatable tube that extends through a portion of the inflatable curtain. The inflatable curtain 14 of the present invention is free from association with an inflatable tube.

A second embodiment of the present invention is illustrated in FIG. 3. The second embodiment of the invention is similar to the first embodiment of the invention illustrated in FIGS. 1 and 2. Accordingly, numerals similar to those of FIGS. 1 and 2 will be utilized in FIG. 3 to identify similar components, the suffix letter "a" being associated with the numerals of FIG. 3 to avoid confusion.

The apparatus 10a (FIG. 3) of the second embodiment is identical to the apparatus 10 (FIGS. 1 and 2), except that the configuration of the inflatable curtain 14a (FIG. 3), specifically the portion 70a, differs from the configuration of the inflatable curtain 14 (FIGS. 1 and 2).

In the second embodiment illustrated in FIG. 3, the portion 70a extends along the fore and aft extent of the inflatable curtain 14a and is positioned between the upper edge 52a and the lower edge 54a of the curtain. The inflatable curtain 14a includes first and second rows 120 and 124 of apertures 82a. The apertures 82a in the first row 120 are spaced along the length of the inflatable curtain 14a along a first edge 122 of the portion 70a. The first edge 122 of the portion 70a is located adjacent to the lower edge 54a of the inflatable curtain 14a. The apertures 82a in the second row 124 are spaced along the length of the inflatable curtain 14a along a second edge 126 of the portion 70a opposite the first edge 122. The second edge 126 is spaced away from the upper and lower edges 52a and 54a of the inflatable curtain 14a.

The flexible elongated member 90a extends from the first location 96a and is coiled around the portion 70a of the inflatable curtain 14a in a helical configuration. The flexible elongated member 90a passes through the apertures 82a in the first and second rows 120 and 124 and wraps around the first and second edges 122 and 126 of the portion 70a as the flexible elongated member 90a coils around the portion 70a to the second location 102a.

In the inflated condition, the tensioned flexible elongated member 90a resists movement of the inflatable curtain 14a away from the side structure 16a of the vehicle 12a. Thus, the flexible elongated member 90a helps maintain the position of the inflated curtain 14a between any occupant of the vehicle 12a and the side structure 16a of the vehicle 12a.

A third embodiment of the present invention is illustrated in FIG. 4. The third embodiment of the invention is similar to the first embodiment of the invention illustrated in FIGS. 1 and 2. Accordingly, numerals similar to those of FIGS. 1 and 2 will be utilized in FIG. 4 to identify similar components, the suffix letter "b" being associated with the numerals of FIG. 4 to avoid confusion.

The apparatus 10b (FIG. 4) of the second embodiment is identical to the apparatus 10a (FIG. 3), except that the configuration of the inflatable curtain 14b (FIG. 4), specifically the portion 70b, differs from the configuration of the inflatable curtain 14a (FIG. 3).

In the third embodiment illustrated in FIG. 4, the portion 70b extends along the fore and aft extent of the inflatable curtain 14b and is spaced away from the upper and lower edges 52b and 54b of the curtain. The portion 70b is also positioned between first and second chamber portions 130 and 132 of the inflatable volume 34b of the inflatable curtain 14b. The first chamber portion 130 is positioned between the lower edge 54b of the inflatable curtain 14b and the portion 70b and extends along the length of the inflatable curtain 14b. The second chamber portion 132 is positioned between the upper edge 52b of the inflatable curtain 14b and the portion 70b and extends along the length of the inflatable curtain 14b.

The portion 70b is defined by stitching 72b that secures the outer panel to the inner panel 48b. The stitching 72b is segmented along the length of the portion 70b so as to form passages 78b that provide fluid communication between the first chamber portion 130 and the portion 70b and between the second chamber portion 132 and the portion 70b.

The inflatable curtain 14b includes first and second rows 120b and 124b of apertures 82b. The apertures 82b of the first row 120b are spaced along the length of the inflatable curtain 14b along a first edge 122b of the portion 70b located adjacent to the first chamber portion 130. The first edge 122b of the portion 70b is spaced away from the lower edge 54b of the inflatable curtain 14b. The apertures 82b in the second row 124b are spaced along the length of the inflatable curtain 14b along a second edge 126b of the portion 70b located adjacent to the second chamber portion 132. The second edge 126b of the portion 70b is spaced away from the upper edge 52b of the inflatable curtain 14b.

The flexible elongated member 90b extends from the first location 96b and is coiled around the portion 70b of the inflatable curtain 14b in a helical configuration. The flexible elongated member 90b passes through the apertures 82b in the first and second rows 120b and 124b and wraps around the first and second edges 122b and 126b of the portion 70b as the flexible elongated member 96b coils around the portion 70b to the second location 102b.

In the inflated condition, the tensioned flexible elongated member 90b resists movement of the inflatable curtain 14b away from the side structure 16a of the vehicle. Thus, the flexible elongated member 90b helps maintain the position of the inflated curtain 14b between any occupant of the vehicle 12b and the side structure 16b of the vehicle 12b.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:

an inflatable vehicle occupant protection device adapted to inflate away from the vehicle roof into a position between the side structure of the vehicle and a vehicle occupant, said inflatable vehicle occupant protection device having a perimeter defined by an upper edge adapted to be positioned adjacent the vehicle roof, an opposite lower edge, and front and rear edges spaced apart along said upper and lower edges, said inflatable vehicle occupant protection device comprising overlying panels secured together along said perimeter to define an inflatable volume within said perimeter, said inflatable vehicle occupant protection device including a portion that is at least partially defined by linearly extending stitching located between said front and rear edges and by a plurality of apertures encircled by said stitching and separating said portion from a remainder of said inflatable vehicle occupant protection device, said linearly extending stitching being omitted at certain locations on said inflatable vehicle occupant protection device to provide at least three fluid passages for providing fluid communication between said portion and said remainder of said inflatable vehicle occupant protection device, said at least three fluid passages being aligned linearly with one another and with said plurality of apertures between said front and rear edges of said inflatable vehicle occupant protection device;

an inflator for providing inflation fluid for inflating said inflatable vehicle occupant protection device; and a flexible elongated member extending through said apertures in said inflatable vehicle occupant protection device and being coiled around said portion of said inflatable vehicle occupant protection device, said flexible elongated member having a first end that extends beyond said front edge of said inflatable vehicle occupant protection device and is adapted to be fixed to the side structure of the vehicle at a first location, said flexible elongated member having an opposite second end that extends beyond said rear edge of said inflatable vehicle occupant protection device and is adapted to be fixed to the side structure of the vehicle at a second location;

said flexible elongated member being adapted to resist movement of said inflatable vehicle occupant protection device away from the side structure of the vehicle when said inflatable vehicle occupant protection device is inflated.

2. Apparatus as defined in claim 1, wherein said flexible elongated member wraps around and outside of said lower edge of said portion of said inflatable vehicle occupant protection device.

3. Apparatus as defined in claim 1 wherein said flexible elongated member comprises a strap of a fabric material.

4. Apparatus as defined in claim 1 wherein said inflatable vehicle occupant protection device has a length defined between said front and rear edges of said inflatable vehicle occupant protection device and wherein said portion has a length that is equal to the length of said inflatable vehicle protection device.

5. Apparatus as defined in claim 1, wherein said inflatable vehicle occupant protection device is an inflatable curtain adapted to have a stored position extending along the side structure adjacent to the roof of the vehicle, said inflatable curtain adapted to be inflated in a first direction away from the vehicle roof and extending fore and aft in the vehicle along the side structure of the vehicle, said portion extending along the fore and aft extent of said inflatable curtain.

6. Apparatus as defined in claim 5 wherein said first location is positioned forward of said front edge of said inflatable curtain and said second location is located rearward of said rear edge of said inflatable curtain.

7. Apparatus as defined in claim 6 wherein said first and second locations are positioned below said lower edge of said inflatable curtain when said inflatable curtain is inflated, said flexible elongated member tensioning said inflatable curtain in said first direction.

8. Apparatus as defined in claim 5, further including a fill tube having a portion located in said inflatable curtain, said inflator being in fluid communication with said fill tube, said inflator, when actuated, providing inflation fluid to said fill tube, said fill tube directing said inflation fluid into said inflatable curtain to inflate said inflatable curtain.

9. Apparatus as defined in claim 8, wherein said portion of said inflatable volume of said inflatable vehicle occupant protection device has a generally tubular configuration and extends along said lower edge of said inflatable curtain, said portion having an edge defined by said plurality of apertures and spaced away from said upper edge and said lower edge of said inflatable curtain.

10. Apparatus as defined in claim 9, wherein said inflatable curtain has a length measured in the direction of vehicle travel, said plurality of apertures being a row of apertures that extends along the length of said inflatable curtain, each aperture extending through said inflatable curtain and being located along said edge of said portion, said flexible elongated member being coiled around said portion in a helical configuration, said flexible elongated member passing through said apertures and wrapping around said portion and said lower edge.

11. Apparatus as defined in claim 10, wherein said portion of said inflatable curtain is adapted to expand radially and laterally in the vehicle, a helical diameter and a helical length of a helix portion of said flexible elongated member increasing as said portion of said inflatable curtain is inflated.

12. Apparatus as defined in claim 11, wherein said flexible elongated member is adapted to be tensioned between said first and second locations of the vehicle when said inflatable vehicle occupant protection device is inflated.

13. Apparatus as defined in claim 8, wherein said portion of said inflatable volume of said inflatable vehicle occupant protection device has a generally tubular configuration and extends along the fore and aft extent of said inflatable curtain, said portion having a first edge located adjacent to said lower edge of said inflatable curtain and an opposite second edge spaced away from said upper edge of said inflatable curtain.

14. Apparatus as defined in claim 13, wherein said inflatable curtain has a length measured in the direction of vehicle travel, said plurality of apertures forming a first row along the length of the inflatable curtain, other apertures forming a second rows of apertures that extends along the length of said inflatable curtain, each aperture of the first and second rows of apertures extending through said inflatable curtain, said first row being located along said first edge of said portion, said second row being located along said second edge of said portion, said flexible elongated member being coiled around said portion in a helical configuration, said flexible elongated member passing through said first and second rows of apertures and wrapping around said portion.

15. Apparatus as defined in claim 14, wherein said portion of said inflatable curtain is adapted to expand radially and laterally in the vehicle, a helical diameter and a helical length of a helix portion of said flexible elongated member increasing as said portion of said inflatable curtain is inflated.

16. Apparatus as defined in claim 15, wherein said flexible elongated member is adapted to be tensioned between said first and second locations of the vehicle when said inflatable vehicle occupant protection device is inflated.

17. Apparatus as defined in claim 8, wherein said portion of said inflatable volume of said inflatable vehicle occupant protection device has a generally tubular configuration and extends along the fore and aft extent of said inflatable curtain, said portion being spaced away from said lower edge and said upper edge of said inflatable curtain, said portion having a first edge spaced away from said lower edge of said inflatable curtain and an opposite second edge spaced away from said upper edge of said inflatable curtain.

18. Apparatus as defined in claim 17, wherein said inflatable curtain has a length measured in the direction of vehicle travel, said plurality of apertures forming a first row along the length of the inflatable curtain, other apertures forming a second rows of apertures that extends along the length of said inflatable curtain, each aperture of the first and second rows of apertures extending through said inflatable curtain, said first row being located along said first edge of said portion, said second row being located along said second edge of said portion, said flexible elongated member being coiled around said portion in a helical configuration, said flexible elongated member passing through said first and second row of apertures and wrapping around said portion.

19. Apparatus as defined in claim 18, wherein said portion of said inflatable curtain is adapted to expand radially, a helical diameter and a helical length of a helix portion of said flexible elongated member increasing as said portion of said inflatable curtain is inflated.

20. Apparatus as defined in claim 19, wherein said flexible elongated member is adapted to be tensioned between said first and second locations of the vehicle when said inflatable vehicle occupant protection device is inflated.

* * * * *